United States Patent [19]
Larousse

[11] Patent Number: 5,490,273
[45] Date of Patent: Feb. 6, 1996

[54] SYSTEM OF DEDICATED ELEMENTARY DATA PROCESSING MACHINES ORGANIZED IN MULTIPLE LEVELS AND SELECTIVELY ACTIVATED TO PROCESS INCOMING EVENTS

[75] Inventor: Roger Larousse, Les Ulis, France

[73] Assignee: Societe Anonyme Dite: Alcatel Cit, Paris, France

[21] Appl. No.: 255,811

[22] Filed: Jun. 7, 1994

Related U.S. Application Data

[63] Continuation of Ser. No. 700,284, May 15, 1991, abandoned.

[30] Foreign Application Priority Data

May 16, 1990 [FR] France .................... 90 067114

[51] Int. Cl.$^6$ .................................................. G06F 15/16
[52] U.S. Cl. .................. 395/650; 395/200.03; 395/800; 379/70; 364/DIG. 1; 364/230.3
[58] Field of Search .................................. 395/650, 800; 379/70

[56] References Cited

U.S. PATENT DOCUMENTS

| | | | |
|---|---|---|---|
| 4,344,134 | 8/1982 | Barnes ........................... | 395/800 |
| 4,954,945 | 9/1990 | Inoue ............................. | 395/650 |
| 5,117,420 | 5/1992 | Hillis et al. .................... | 370/60 |
| 5,159,689 | 10/1992 | Shiraishi ........................ | 395/800 |

FOREIGN PATENT DOCUMENTS 0228053  7/1987  European Pat. Off.

OTHER PUBLICATIONS

Electrical Communication, vol. 54, No. 3, 1979, pp. 199–204; A. Gardiner et al.: "ITT 1230 digital exchange—Software design for digital exchanges".

*Primary Examiner*—Ken S. Kim
*Attorney, Agent, or Firm*—Sughrue, Mion, Zinn, Macpeak & Seas

[57] ABSTRACT

A data processing machine comprises a plurality of elementary machines (SUPMS, DEP, ARR, . . . ) disposed in a plurality of levels (level 1, level 2, . . .), and an event presentation device (PTA) responding to the arrival of an event by identifying the lowest machine level that is active and by identifying the elementary machine that is active in this lowest active machine level to present the event to said active elementary machine. An active elementary machine at any intermediate machine level comprises lower level activation means making it possible to respond to certain events by activating the next lower machine level and to activate a lower elementary machine in said lower machine level, and means for responding to certain other events that are not processed by said active elementary machine by sending them up to a higher level, thereby enabling an event to be transferred to an active higher elementary machine in the machine level immediately above the machine level to which said active elementary machine belongs. Said active elementary machine also includes deactivation means enabling it to respond to a particular event by deactivating itself and simultaneously deactivating any lower level elementary machine that it may previously have activated.

12 Claims, 2 Drawing Sheets

SYSTEM OF DEDICATED ELEMENTARY DATA PROCESSING MACHINES ORGANIZED IN MULTIPLE LEVELS AND SELECTIVELY ACTIVATED TO PROCESS INCOMING EVENTS

This is a Continuation of application Ser. No. 07/700,284, filed May 15, 1991, now abandoned.

The present invention relates to a data processing machine structure.

BACKGROUND OF THE INVENTION

A data processing machine is a device possessing a plurality of states and designed to process input events. In each of these states, it responds to any input event by accomplishing a sequence of predetermined data processing operations, which sequence may include initializing output events, some of which may cause the machine to pass to another state.

More specifically, such a machine may be constituted by a computer provided, inter alia, with a finite state program having a state indication capable of taking up as many values as there are states. Input events are signals of external origin input via input/output means of the computer, or else they are signals of internal origin, created by program. They are combined with the state indication to generate output events by executing a program corresponding to each combination, which output events are signals transmitted externally from the computer by the input/output means or are processed by other programs in the computer, and some of the output events may cause a change of state in the machine.

For example, if the machine is to perform analysis and decision functions in a telephone installation, then it will have as many states as such telephone processing may require (line free, line busy, sending dial tone, receiving first digit, etc.). In each state, the expected events are not only those to be expected in the normal course of setting up a call (sending digits, lines or circuits available or busy, one party or the other hanging up), but also events that are abnormal or rare (failure of some piece of equipment, hardware or software, shortage of resources, early termination of ongoing dialog, etc.). It will be understood that this can lead to a large number of states, with each of them being associated with another large number of events. The machine becomes large, and thus expensive to design and develop, test, maintain, etc.

To improve this situation, thought has already been given to using a plurality of sub-machines instead of a single machine, with each sub-machine including some of the states of the machine as a whole, such that the total number of states is reduced, e.g. by giving a single machine a series of states that appear iteratively because they correspond to a function that is performed several times over while processing data. The number of events to be processed in each state remains unchanged. Furthermore, it is necessary to provide additional functions to allow the individual machines to dialog with one another and an additional switching function to direct input events to the appropriate machine(s). These additional dispositions are expensive, in particular in processing time.

SUMMARY OF THE INVENTION

The present invention therefore seeks to provide a data processing machine structure that enables both the overall number of states and the number of events to be processed in each state to be reduced.

The data processing machine of the present invention comprises a plurality of elementary machines disposed in a plurality of levels, and an event presentation device responding to the arrival of an event by identifying the lowest machine level that is active and by identifying the elementary machine that is active in this lowest active machine level to present the event to said active elementary machine, an active elementary machine at any intermediate machine level comprising lower level activation means making it possible to respond to certain events by activating the next lower machine level and to activate a lower elementary machine in said lower machine level, and means for responding to certain other events that are not processed by said active elementary machine by sending them up to a higher level, thereby enabling an event to be transferred to an active higher elementary machine in the machine level immediately above the machine level to which said active elementary machine belongs, said active elementary machine also including deactivation means enabling it to respond to a particular event by deactivating itself and simultaneously deactivating any lower level elementary machine that it may previously have activated.

In addition to reducing the total number of states by using a machine built up from a plurality of elementary machines, with each elementary machine being designed to perform a subfunction whenever that is appropriate at the request of any one of the activated elementary machines at the various different levels, the above dispositions provide the possibility of limiting the number of events treated by each or some of the elementary machines by making it possible to provide at least one elementary machine that is specialized in processing common events that may occur at any moment, or at least frequently, during the processing performed by the machine, which common events would otherwise require processing in all or nearly all of the states of the elementary machines at lower level(s). The overall reduction in finite state machine volume obtained by the factoring achieved both by creating elementary machines of the sub-program type and by centralizing common event processing to higher levels makes it possible to simplify design and reduce the costs of development, validation, and maintenance.

In addition, the said active elementary machine at the lowest active machine level is the machine which corresponds to the subfunction being performed. An event that occurs will usually belong to that subfunction and should be treated by that active elementary machine. The invention makes it possible to process the majority of events directly by the appropriate elementary machine and without switching events between the various sub-machines, while relatively rare events that do not belong to the current subfunction are processed by elementary machines at higher level(s). This improves performance in the execution of data processing.

Advantageously, said activation means serve to activate a selected one from a plurality of lower elementary machines in said lower machine level as a function of the event presented and/or of the state of said active elementary machine.

BRIEF DESCRIPTION OF THE DRAWINGS

An embodiment of the invention is described byway of example with reference to the accompanying drawings, in which.

DETAILED DESCRIPTION

Figure 1:
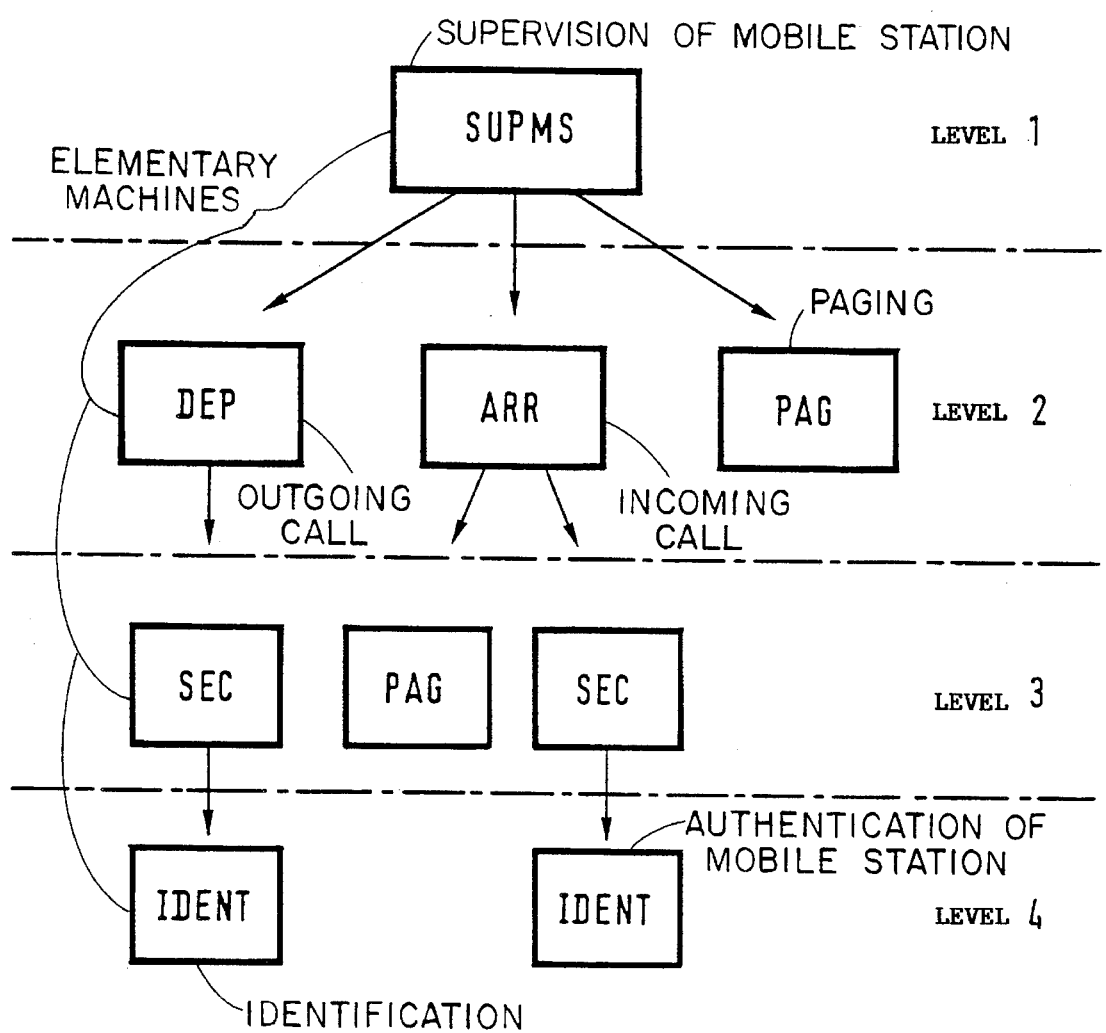
FIG. 1 shows the structure of a data processing machine of the present invention suitable for processing calls in a radiotelephone network.

The machine whose structure is shown in FIG. 1 is designed to process calls in a radiotelephone network, and in particular to process the portion of such calls that relate to mobile terminals. This machine comprises four levels: level 1, level 2, level 3, and level 4.

Level 1 includes a single elementary machine SUPMS whose function is to supervise the mobile terminal during the processing of a call relating to the terminal. More precisely, elementary machine SUPMS processes all events relating to the state of the terminal and/or the other party to the call that should lead to the call being released and that may occur at any moment during a call, such as:

mobile terminal hang up;

other party hang up;

communication protocol error between the mobile terminal and the network;

a software or hardware fault, wherever that may occur;

interruption of dialog between the mobile terminal and the base station with which it was in communication;

radio channel failure; etc.

This elementary machine SUPMS also processes requests for transferring a call from one base station to another base station due to the mobile station moving, which requests may naturally occur at any moment during a call. Such call transfer requires new ground and radio resources to be brought into operation, while old resources are released.

Level 2 comprises three elementary machines, DEP, ARR, and PAG. As indicated by the arrows running from elementary machine SUPMS towards elementary machines DEP, ARR, and PAG, one of these three elementary machines is selectively activated by elementary machine SUPMS.

The function of elementary machine DEP is to supervise the setting up of an outgoing call, i.e. a call coming from the mobile terminal served by the machine of FIG. 1. In this context, it oversees authentication of the mobile terminal, i.e. that it is identified by security means described in greater detail below, it receives and analyzes dialing, it determines call routing, and it causes ground and radio resources to be made available until the called party starts ringing, at which point it deactivates itself.

The function of elementary machine ARR is to supervise the setting up of an incoming call, i.e. a call to a mobile terminal served by the machine of FIG. 1. In this context, it oversees determining the cell in which the mobile terminal is located by means that are described in greater detail below, it then oversees authentication of the mobile terminal as mentioned above, and finally it makes ground and radio resources available until the called mobile terminal starts ringing, after which it deactivates itself.

The function of elementary machine PAG is to locate a mobile terminal in one of the cells of a location zone. It is activated by elementary machine SUPMS in the event of a mobile location request from an operator command. It deactivates itself after fulfilling its function.

Level 3 also comprises three elementary machines, comprising the machine PAG already described at level 2, and an elementary machine SEC which appears twice over. It should be observed that in this case, elementary machine PAG is called whenever there is a need to locate a mobile while setting up an incoming call. The function of elementary machine SEC is to authenticate the mobile terminal identified by its international mobile subscriber identification (IMSI) number, which is assumed to be known, then radio channel enciphering is put into operation, a temporary mobile subscriber identification (TMSI) number is allocated, and then elementary machine SEC deactivates itself. If authentication fails, then elementary machine SEC brings elementary machine IDENT into operation which serves, as explained below, to obtain the international identification number IMSI from the mobile terminal itself, after which a new authentication sequence is performed so that the processing described above can be continued.

Level 4 comprises the above-mentioned machine IDENT which may be used several times by the level 3 machine SEC as mentioned above. Its function is to request the international identification number IMSI of a mobile subscriber, either from the center from which the mobile terminal used to depend and which it has left while moving, or else from the mobile terminal itself, if the identification cannot be obtained from the previous center. It deactivates itself after it has fulfilled its function.

The functions described above are well known in radiotelephony and reference may be made to the very numerous documents that have been published on this subject. Use of the elementary machines is illustrated in the context of an outgoing call and of an incoming call only.

For an outgoing call from a mobile terminal subscriber and processed by the machine of FIG. 1, the machine, on taking charge of a call, marked pca, activates machine level 1 and in level 1 it activates elementary machine SUPMS. Elementary machine SUPMS supervises the state of the connection with the mobile terminal, observes that an outgoing call is being made, activates machine level 2, and in machine level 2 it activates elementary machine DEP. DEP begins with security authentication of the mobile terminal. To do this it activates machine level 3, and in level 3 it activates elementary machine SEC. If necessary for performing identification per se, elementary machine SEC activates machine level 4 and in level 4 it activates elementary machine IDENT. Once identification has taken place, elementary machine IDENT deactivates itself and machine level 4 is likewise deactivated. Control is given back to elementary machine SEC in machine level 3, which then installs enciphering on the radio channel and, if necessary, reallocates a temporary identification number to the mobile terminal. Thereafter it deactivates itself and machine level 3 is likewise deactivated, such that elementary machine DEP takes over to receive the number of the called party, to analyze the number, to determine the appropriate routing, and to supervise the call until the called party (assumed to be free) starts ringing. At this point, given that the outgoing call set-up stage has been terminated, machine DEP deactivates itself and machine level 2 is likewise deactivated, with the call being under the control only of elementary machine SUPMS at level 1, which is the only machine now active.

For an incoming call, the call is initially supervised by elementary machine SUPMS at the sole active level, level 1. Level 2 is then activated, and in particular machine ARR in order to supervise the setting-up stage of the incoming call. It is first necessary to determine the cell in which the destination mobile terminal is located, and this is done by activating level 3, and in level 3 activating elementary machine PAG. Once the terminal has been located, machine PAG deactivates itself and level 3 is thus deactivated, only to be immediately reactivated by elementary machine ARR activating elementary machine SEC. The function of elementary machine SEC has already been described, together with the way it makes use of elementary machine IDENT and level 4 to identify the mobile terminal in question. Thereafter, as already described, elementary machines IDENT, SEC, and ARR deactivate themselves one after another, likewise deactivating levels 4, 3, and 2, with an established incoming call finally being supervised only by elementary machine SUPMS at level 1.

It remains to be mentioned that should the radio station request call transfer, that event is received by and is controlled directly by elementary machine SUPMS regardless of the state of any elementary machines that may be active at lower levels.

It will be observed that the same elementary machine, e.g. SEC, may be activated by several different higher level elementary machines. In other words, the function performed by the elementary machine SEC occurs in several different data processing stages of the machine as a whole and by using the same elementary machine in all of these various stages, the total number of machine states is reduced. The same applies to elementary machines IDENT and PAG.

It will also be observed that an elementary machine at a given level may selectively activate several different elementary machines at the next level down in order to request execution of successive functions. This makes it easier to split up functions and to design elementary machines capable of taking part in different data processing stages.

Figure 2:
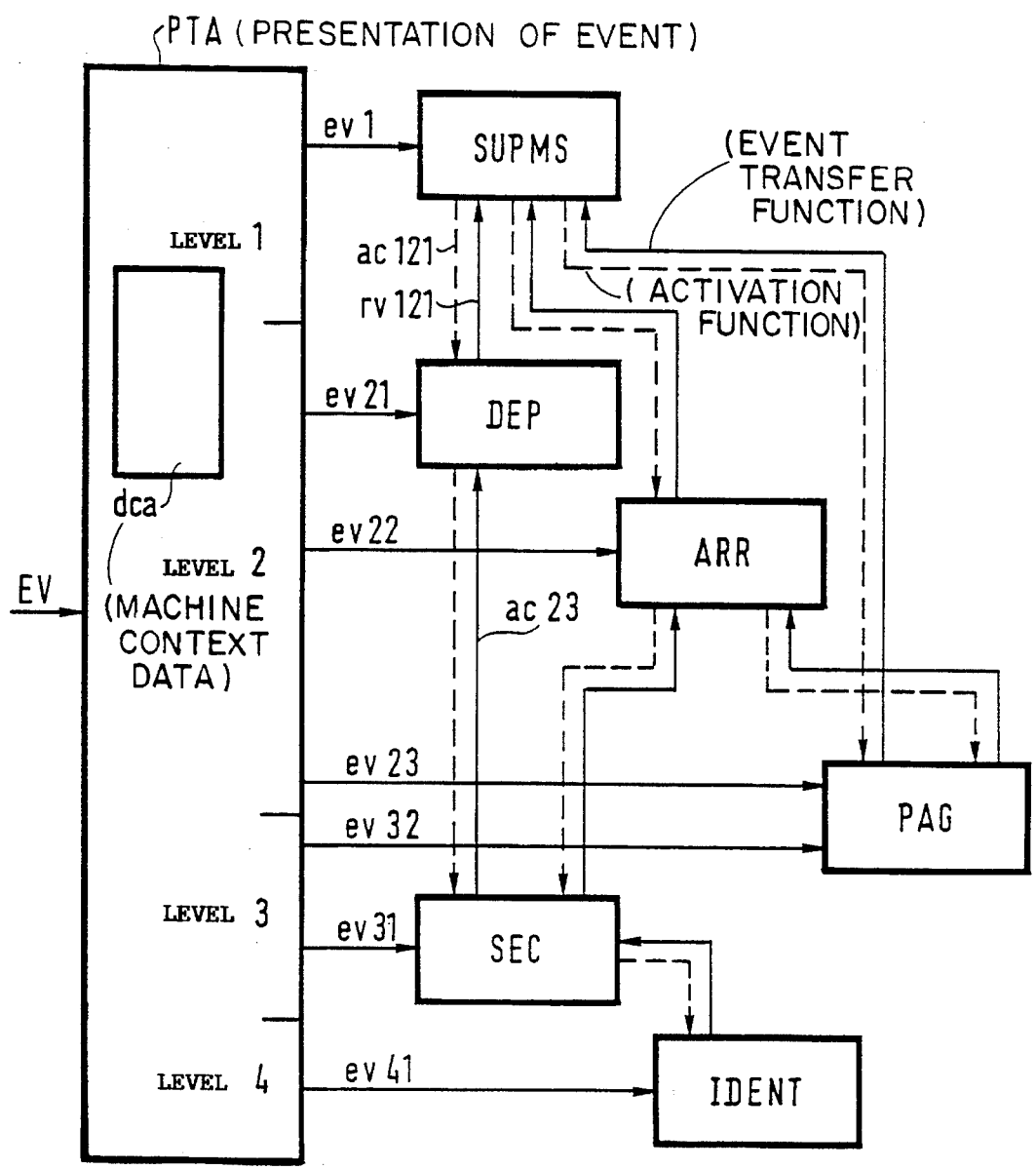
FIG. 2 is a diagram showing subfunction linkage and showing how events are directed to the elementary machines, e.g. in the context of the machine of FIG. 1.

However, the reduction in the number of events generally processed by each elementary machine comes from the way these events are allocated to the activated elementary machines, as appears from the following description made with reference to FIG. 2.

FIG. 2 shows the flow of events between the various elementary machines. An event-presenting device PTA referred to as a "preprocessor machine" receives external events, determines the lowest level of the machine in which an elementary machine is active, and presents the received event to that elementary machine. Dashed line connections represent activation functions, whereas solid line connections represent event transfer functions.

The way in which the various elementary machines are activated is described above. When the machine takes charge of a call, the preprocessor machine activates machine level 1 by default since no other machine level has yet been activated, and it activates the machine SUPMS since that is the only machine defined at this level. An arbitrary event EV submitted to the preprocessor machine PTA is thus attributed to the active machine level, level 1, and it is transmitted to the elementary machine that is active at this level, i.e. to elementary machine SUPMS, and this is illustrated by connection ev1. The machine SUPMS must be capable of processing the event in question. During this processing, the elementary machine may possibly generate output events and it may possibly change state. On receiving a particular event marking the beginning of a call, elementary machine SUPMS activates the appropriate elementary machine, e.g. elementary machine DEP, and this is illustrated by connection ac121. The machine context data dca is updated to show that level 2 is now active.

If both machine level 1 and level 2 are active when the preprocessor machine PTA receives an event EV, then it selects level 2 in preference to level 1 and transmits the received event to that one of the elementary machines in level 2 that is active, e.g. elementary machine DEP, and this is illustrated by connection ev21. Three circumstances can then arise:

if the event needs to be processed by elementary machine DEP, then the corresponding processing is performed, output events may possibly be generated, and machine DEP may change state;

if the event requires action from a different elementary machine, in particular elementary machine SEC, then that machine is activated and where appropriate the event in question is transmitted to it, as illustrated by connection ac23, with the machine context data DCA being updated to show that level 3 is now active; or if the event is not one of the events that is processed by elementary machine DEP as in the two above circumstances, then it is sent up to the elementary machine (SUPMS) that activated the elementary machine in question (DEP), with this being illustrated by connection rv121.

As a result, the elementary machine in question (DEP) is designed to respond to a limited list of events that have some bearing on the function it is required to perform. Some specific events requiring a subfunction to be activated are performed by activating the elementary machine at the next level down (level 3) for performing the subfunction (in this case machine SEC), whereas other events are sent up to the higher machine level (level 1) and in that level they are sent to the active elementary machine (SUPMS) that activated the elementary machine in question (DEP). The processing performed by the active elementary machine at the higher machine level may include deactivating the machine that initially received the event.

The above applies equally well to the active elementary machine at machine level 2 being elementary machine ARR. The only difference is that elementary machine ARR may selectively activate one out of several elementary machines (SEC, PAG) in the next lower machine level. The same applies again if the active elementary machine in the machine level 2 is machine PAG, except this time it has no lower level elementary machines to activate.

The same also applies when machine level 3 is active after levels 1 and 2 have been activated, while machine level 4 is still not active. An incoming event is then transmitted either to elementary machine SEC (connection ev31) or to elementary machine PAG (connection ev32), depending on which elementary machine is active at this level.

Assuming that an event has been transmitted in this way to elementary machine SEC, it responds in the same way as higher level machines. It may be observed that if the event is to be sent up to a machine at the next higher machine level (level 2), the event is merely sent to the elementary machine at the next higher level which is currently active, and that machine will indeed be the machine that activated the elementary machine in question (SEC) that initially receives the event being sent up.

The same applies to elementary machine PAG, but more simply since returning to the next higher machine level, level 2, can only lead to elementary machine ARR.

The same can be applied to machine level 4 and its machine IDENT.

Finally, it may happen that the elementary machine at an intermediate level cannot itself process an event sent up to it by an elementary machine from a lower level. Naturally, under such circumstances, the event is sent up again to the active elementary machine at the next higher level.

As a result, and in general, each elementary machine only processes those events that are normally expected in the course of that portion of the data processing that is allocated thereto. This reduces the number of events that each elementary machine needs to be able to process practically to a minimum. The advantages that this provides have already been mentioned. In addition, these normally expected events are the most probable events, and events that require sending up a level are relatively infrequent, such that the mechanism described above for sending messages up a level is not expensive in processing time.

I claim:

1. A data processing machine comprising:

a plurality of elementary machines, each dedicated to a different function, disposed in a plurality of machine levels, an elementary machine being able to be either (1) active, and a candidate for handling an incoming event, or (2) not active, and unavailable for handling incoming events; and an event presentation device responding to the arrival of an event by identifying the lowest machine level that is active and by identifying the elementary machine that is active in this lowest active machine level to present the event to said active elementary machine;

each of said plurality of machine levels respectively being either (1) active, and having an active elementary machine disposed therein, or (2) inactive, and having no active elementary machine disposed therein;

an active elementary machine in any level responding to an event which can be processed by said active machine by performing said dedicated different function, an active elementary machine at any intermediate machine level comprising lower level activation means for responding to certain events by activating, in accordance with said certain events, a lower elementary machine in a next lower machine level, thereby activating the next lower machine level, and means for responding to certain other events that are not processed by said active elementary machine by sending them up to a higher level, thereby enabling an event to be transferred to and handled by an active higher elementary machine in the machine level immediately above the machine level to which said active elementary machine belongs, said active elementary machine also including deactivation means enabling it to respond to a particular event by deactivating itself and simultaneously deactivating any lower level elementary machine that it may previously have activated.

2. A data processing machine according to claim 1, wherein said activation means serve to activate a selected one from a plurality of lower elementary machines in said lower machine level as a function of the event presented and/or of the state of said active elementary machine.

3. A data processing machine according to claim 2, wherein said data processing machine is a finite state machine, and wherein the number of levels is at least three.

4. A data processing machine according to claim 3, wherein at a given time one or more of said levels is active, and wherein in one level only one elementary machine is active.

5. A data processing machine according to claim 4, wherein only one said elementary machine initially appears as a candidate for processing said event.

6. A data processing machine according to claim 5, wherein the number of levels is four.

7. A data processing system for performing functions indicated by incoming events, each of said functions being predefined by a respective set of sub-functions, said system comprising:

elementary data processing machines for performing said sub-functions; and an event presentation device;

each of said machines being either active or inactive, wherein active machines are available for handling said incoming events and inactive machines are unavailable for handling said incoming events;

each of said sub-functions being performed, in a dedicated manner, only by a corresponding one of said machines;

each said respective set of sub-functions defining a corresponding set of said machines, which are hierarchically interrelated in a corresponding set of relationships;

within each corresponding set of relationships, each of said corresponding set of said machines has a corresponding machine level within a plurality of hierarchical machine levels;

wherein said event presentation device responds to an arrival of a given event of said incoming events according to the steps of:

identifying an active one of said machines having a lowest respective level; and then presenting said given event to said identified machine having said lowest respective level;

and wherein said identified machine responds to said presentation of said given event according to the steps of:

evaluating said given event to determine what sub-function of said respective set of sub-functions is to be performed; and handling said given event according to the following rules:

if said corresponding one of said machines for performing said sub-function to be performed is said identified machine, then said identified machine handles said given event by performing said sub-function to be performed;

else, if said corresponding one of said machines for performing said sub-function is hierarchically lower than said identified machine, within said corresponding set of relationships for said respective set of sub-functions, then said identified machine handles said given event by using lower-level activation means to activate a respective next-lower machine of said corresponding set of machines in a respective next-lower level within said corresponding set of relationships for said respective set of sub-functions, and by presenting said event to said activated next-lower machine;

else, said identified machine handles said given event by presenting said event to a respective next-higher machine of said corresponding set of machines in a respective next-higher level within said corresponding set of relationships for said respective set of sub-functions, and by using deactivation means to deactivate itself, wherein said respective next-higher machine is a machine which most recently activated said identified machine.

8. A data processing system according to claim 7, wherein said lower level activation means selects for activation said respective next-lower machine from a plurality of respectively next-lower machines as a function of the state of said identified machine.

9. A data processing system according to claim 8, wherein said data processing system is comprised of a finite state machine, and wherein the number of said plurality of hierarchical machine levels is at least three.

10. A data processing system according to claim 9, wherein at a given time one or more of said plurality of hierarchical machine levels is active, and wherein one of said plurality of hierarchical machine levels has only one of said machines which is active.

11. A data processing system according to claim 10, wherein only one of said machines is initially active.

12. A data processing system according to claim 11, wherein the number of said plurality of hierarchical machine levels is four.

* * * * *